(12) United States Patent
Nagaya et al.

(10) Patent No.: US 6,312,201 B1
(45) Date of Patent: *Nov. 6, 2001

(54) INTERFERENCE FIT TYPE CUTTING TOOL

(75) Inventors: Hidehiko Nagaya; Hiroshi Shimomura; Masayuki Okawa; Kazuya Yamazaki; Takamasa Shimano, all of Ibaraki-ken (JP)

(73) Assignee: Mitsubishi Materials Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/440,279

(22) Filed: Nov. 15, 1999

(30) Foreign Application Priority Data

Dec. 9, 1998 (JP) .................................................. 10-350405

(51) Int. Cl.$^7$ ............................ B23B 31/10; B23P 11/02; B23C 9/00
(52) U.S. Cl. ............................ 409/234; 279/103; 82/158; 407/46; 407/101; 403/273; 403/341; 403/30; 29/447
(58) Field of Search ...................... 82/158, 160; 407/104, 407/46, 101, 34, 30, 33; 408/713, 239 A, 231; 279/103, 102; 403/333, 334, 30, 273, 341; 29/447, DIG. 35; 409/234

(56) References Cited

U.S. PATENT DOCUMENTS

| 3,027,953 | * | 4/1962 | Coski | ................................... | 403/361 |
| 3,100,545 | * | 8/1963 | Zimmerman | ......................... | 403/334 |
| 3,655,244 | * | 4/1972 | Swisher | ................................ | 279/103 |

(List continued on next page.)

FOREIGN PATENT DOCUMENTS 36 07 938  9/1987 (DE).
39 31 536  4/1990 (DE).
42 15 606  11/1993 (DE).

(List continued on next page.)

OTHER PUBLICATIONS

Machinery's Handbook, 25th ed., New York, pp. 901–911, 1996.*
U.S. application No. 09/440,272, filed Nov. 15, 1999, pending.
U.S. application No. 09/456,548, filed Dec. 8, 1999, pending.
U.S. application No. 09/440,282, filed Nov. 15, 1999, pending.

*Primary Examiner*—William Briggs
*Assistant Examiner*—Erica Ergenbright
(74) *Attorney, Agent, or Firm*—Oblon, Spivak, McClelland, Maier & Neustadt, P.C.

(57) ABSTRACT

In an interference fit type cutting tool according to the present invention, a head section and a shank section are fitted together by shrinkage fitting. The shank section is provided with a shaft portion and a taper portion. The head section is provided with a hole portion to be fitted on the shaft portion, and a tapered portion to be fitted on the taper portion. The hole portion and the tapered portion have an interference, and the inner diameters thereof are smaller than the outer diameters of the shaft portion and the taper portion. Two-surface restraint is established by fixing the shaft portion and the hole portion, and the taper portion and the tapered portion with the interference pressure by shrinkage fitting. A key is formed on the leading end face of the shaft portion, a key groove is formed in the bottom face of the hole portion, and the key and the key groove are fitted together. Side faces of the key and the key groove are nearly orthogonal to the principal force of cutting resistance, thereby enhancing dynamic stiffness.

12 Claims, 9 Drawing Sheets

U.S. PATENT DOCUMENTS

| | | |
|---|---|---|
| 3,994,615 | 11/1976 | Narang . |
| 4,047,583 * | 9/1977 | Dyer .................................. 403/334 |
| 4,452,325 | 6/1984 | Radd et al. . |
| 4,547,103 * | 10/1985 | Pape et al. ............................. 407/45 |
| 4,747,735 * | 5/1988 | Erickson et al. ..................... 409/234 |
| 4,834,597 * | 5/1989 | Andersson et al. .................. 279/103 |
| 4,945,793 * | 8/1990 | Von Hase .............................. 82/160 |
| 5,140,739 | 8/1992 | Yamaguchi et al. . |
| 5,173,017 * | 12/1992 | Oshnock et al. ....................... 82/160 |
| 5,193,954 * | 3/1993 | Hunt ..................................... 82/160 |
| 5,280,671 | 1/1994 | Marquart . |
| 5,423,719 * | 6/1995 | Jennings ................................ 407/33 |
| 5,617,602 * | 4/1997 | Okada .................................. 403/333 |
| 5,879,766 | 3/1999 | Kato . |
| 5,957,631 * | 9/1999 | Hecht ................................... 408/713 |
| 6,053,670 * | 4/2000 | Schmid .................................. 407/34 |
| 6,234,729 * | 5/2001 | Cook ...................................... 29/447 |

FOREIGN PATENT DOCUMENTS

| | | | |
|---|---|---|---|
| 3500905 | * | 7/1986 | (DE) ........................................ 82/158 |
| 4139573 | * | 6/1993 | (DE) ........................................ 82/158 |
| 246715 | * | 6/1987 | (DE) ........................................ 82/160 |
| 1243161 | * | 8/1960 | (FR) ........................................ 82/158 |
| 2175227 | * | 11/1986 | (GB) ........................................ 82/158 |
| 62-124807 | * | 6/1987 | (JP) ........................................ 82/158 |
| 6-31506 | * | 2/1994 | (JP) ........................................ 82/158 |
| 1007843 | * | 3/1983 | (SU) ........................................ 82/158 |
| 1346350 | * | 10/1987 | (SU) ........................................ 82/158 |
| 1450922 | * | 1/1989 | (SU) ........................................ 82/158 |

\* cited by examiner

Fig,6
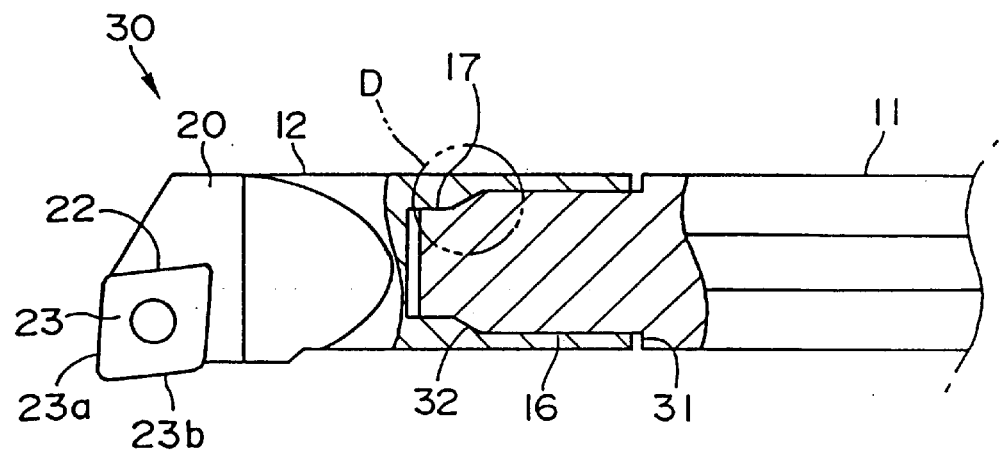
Fig,7
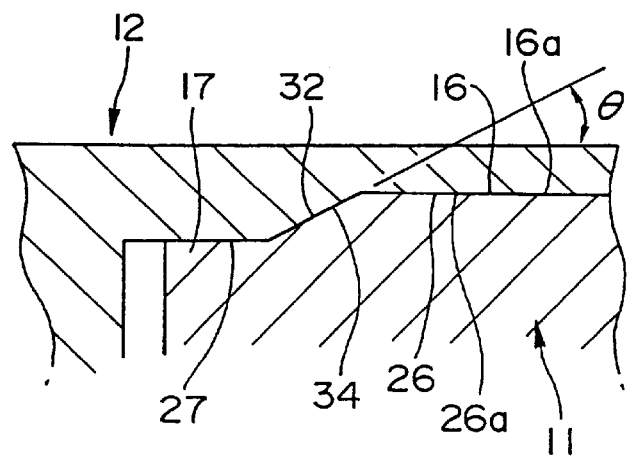

INTERFERENCE FIT TYPE CUTTING TOOL

BACKGROUND OF THE INVENTION

1. Field of the Invention

The present invention relates to an interference fit type cutting tool in which a tool is detachably and replaceably mounted in a tool holding section.

This specification is based on patent applications filed in Japan (Japanese Patent Applications Nos. 10-151753 and 10-350405), and the descriptions in the Japanese applications are incorporated as a part of this specification.

2. Background Art

A boring bar as an example of this type of conventional cutting tool is shown in FIGS. 18 and 19.

This boring bar 1 is formed by detachably fitting a head section 4 having a throwaway tip 3 on a shank section 2 held by a machining center or the like (not shown). In this case, the shank section 2 is made of, for example, expensive cemented carbide having high rigidity. Since the head section 4 is prone to wear and damage due to chip abrasion, it is made of inexpensive steel or the like, and it is detachable and replaceable.

By making the head section 4 replaceable, head sections having different types of cutting edges can be mounted.

Regarding the structure of a fitting section 5 between the head section 4 and the shank section 2 in such a boring bar 1, for example, a projection 6a formed at the center of a leading end face 6 of the shank section 2 is prismatically shaped, and a hole portion 7a in a base end face 7 of the head section 4 is formed in the shape of a prismatic recess. The projection 6a is fitted into the hole portion 7a, so that the leading end face 6 and the base end face 7 are in contact with each other, and the peripheral portions thereof are brazed.

In another structure, the projection 6a is formed in a substantially cylindrical shape and is externally threaded, the hole portion 7a is shaped like a substantially cylindrical recess and is internally threaded to be screwed on the external thread of the projection 6a, and the projection 6a and the hole portion 7a are fitted together.

In a further structure, the projection 6a and the hole portion 7a are subjected to shrinkage fitting.

In such structures of the fitting section 5, however, when a rotating work material is subjected to boring by a cutting edge of the throwaway tip 3, the principal force of cutting resistance is applied in a direction nearly orthogonal to the cutting edge, and is received mainly by the projection 6a and the hole portion 7a, and therefore, a heavy load is imposed on the head section 4 made of steel having a substantially low rigidity. The corners of the prismatic hole portion 7a are apt to crack in the former case, and the screwed portion between the internal thread and the external thread is apt to be damaged in the latter case. Stiffness of the boring bar 1 is low, and tool life is short.

In the case of shrinkage fitting, when the hole portion 7a of the head section 4 is heated and fitted on the projection 6a, and then contracts due to the fall in temperature to ordinary temperature, the base end face 7 of the head section 4 sometimes separates from the leading end face 6 of the shank section 2 due to errors in shrinkage. For this reason, the holding strength and stiffness of the boring bar 1 are low, and tool life is short.

SUMMARY OF THE INVENTION

In view of such circumstances, an object of the present invention is to provide an interference fit type cutting tool that achieves high tool stiffness and increases tool life.

Another object of the present invention is to provide an interference fit type cutting tool that achieves high tool fixing strength and allows high-precision working.

A further object of the present invention is to provide an interference fit type cutting tool that reduces vibration and runout during cutting and allows high-precision working.

In order to achieve the above objects, an interference fit type cutting tool according to the present invention includes a shaft portion provided in one of a tool with a cutting edge and a tool holding section, and a hole portion provided in the other to be interference-fitted on the shaft portion, wherein the shaft portion and the hole portion have a taper portion and a tapered portion at least in a part thereof, and one of the taper portion and the tapered portion has an interference.

Since the tool and the tool holding section are interference-fitted by shrinkage fitting, expansion fitting, or by other means, the shaft portion and the hole portion are fixedly pressed by the interference pressure at the taper portion and the tapered portion. Therefore, mutual holding strength is high, and tool stiffness is improved. Furthermore, the feed force and the principal force are received thereat, and dynamic stiffness is also enhanced.

In a preferred embodiment of the present invention, the shaft portion has a taper portion at the base thereof, and the hole portion has a tapered portion at an opening thereof.

Since the taper portion of the shaft portion and the tapered portion of the hole portion are in contact with each other when the shaft portion and the hole portion are fitted, even if another contact face is uneven, rattling is prevented, reliable pressure contact is established, and fitting strength is improved. For this reason, it is possible to reduce vibration and runout during cutting, and to allow high-precision working.

In another preferred embodiment of the present invention, an interference is provided on one of the peripheral surface of the shaft portion and the inner peripheral surface of the hole portion.

By subjecting the peripheral surface of the shaft portion and the inner peripheral surface of the hole portion, and the tapered portion and the taper portion to interference fitting, two-surface restraint can be established by the interference pressure, and tool stiffness can be improved. Fitting is facilitated and reliably performed by simultaneously cooling the shaft portion and the taper portion thereof from ordinary temperature shrinkage fitting.

When the hole portion and the tapered portion are shrinkage-fitted on the shaft portion and the taper portion, the tapered portion may be fitted on the taper portion while shrinkage thereof is proceeding.

Although dimensional errors in shrinkage sometimes occur when the temperature has returned to ordinary temperature, as long as the offset between the tapered portion and the taper portion is within the interference, the tapered portion and the taper portion are in contact with each other, and the interference pressure acts. Therefore, surface restraint can be ensured without forming a gap therebetween.

In a further preferred embodiment of the present invention, one of the shaft portion and the hole portion has a key, and the other has a key groove to be fitted on the key.

Even when the principal force and the feed force of cutting resistance are applied from the cutting edge so as to twist the head section, they can be partly received by the key and the key groove fitted to each other, which makes it possible to enhance the turn-preventing function during cutting and dynamic stiffness of the tool, to combine the shank section and the head section more firmly by the restraint by interference fitting and the fitting of the key and the key groove, and to thereby improve tool stiffness.

In a further preferred embodiment of the present invention, the key and the key groove extend in a direction nearly orthogonal to the principal force of cutting resistance to be applied to the cutting edge of the head section.

Particularly in a turning tool such as a boring bar, a cutting edge of a tool can be positioned with respect to the mounting position of a tool holding section in a machine tool or the like by a key and a key groove. Furthermore, since the principal force of cutting resistance is received by the key and the key groove placed in a direction nearly orthogonal thereto, dynamic stiffness during cutting is further improved.

In a further preferred embodiment of the present invention, the inner peripheral surface of the hole portion is inclined so that the diameter decreases toward the opening of the hole portion, thereby forming a tapered portion. The peripheral surface of the shaft portion is inclines so that the diameter increases toward the free end of the shaft portion, thereby forming a taper portion.

The hole portion and the shaft portion are subjected to interference fitting, such as shrinkage fitting, and the inner peripheral surface of the hole portion shrinks as cooling proceeds, whereby the peripheral surface of the shaft portion is pressed by the interference pressure. At this time, since the peripheral surface of the shaft portion and the inner peripheral surface of the hole portion are inclined, the shaft portion is pulled into the inner part of the hole portion by the interaction between the inner peripheral surface of the hole portion and the peripheral surface of the shaft portion, thereby increasing fitting strength.

In a further preferred embodiment of the present invention, a shaft portion contact face on the outer periphery of the shaft portion and a hole portion contact face on the outer periphery of the hole portion are in contact with each other at the outer peripheral edges.

When the shaft portion and the hole portion are fitted together, the shaft portion contact face and the hole portion contact face contact at the outer peripheral edges. Therefore, even if the contact faces are uneven, rattling is prevented in fitting, reliable pressure contact is established, and fitting strength is thereby improved. For this reason, vibration and runout are reduced during cutting, and high-precision working is achieved.

Furthermore, two-surface restraint can be established by the pull-in fitting of the peripheral surface of the shaft portion and the inner peripheral surface of the hole portion and the press on the outer peripheral side by the shaft portion contact face and the hole portion contact face, which allows firm shrinkage fitting.

The above-described inventions include a cutting tool in which a tool and a tool holding section are formed of a head section and a shank section, respectively.

The above-described inventions include a fit type cutting tool in which a head section and a shank section serve as a tool and a connecting member serves as a tool holding section. In this case, the head section and the shank section may be provided with a shaft portion, and the connecting member may be provided with a hole portion.

The tool or the tool holding section having the hole portion may be made of a material having a higher coefficient of thermal expansion than that of the tool or the tool holding section having the shaft portion.

In a further preferred embodiment of the present invention:

$$(1/10000)° < \alpha 1 < 2° \text{ and } (1/10000)° < \alpha 2 < 2°$$

where $\alpha 1$ and $\alpha 2$ are acute inclination angles of the peripheral surface of the shaft portion and the inner peripheral surface of the hole portion with respect to the center axis O of the cutting tool.

When the inclination angle $\alpha 1$ of the peripheral surface of the shaft portion is set to be equal to or greater than the inclination angle $\alpha 2$ of the inner peripheral surface of the hole portion, the region of the maximum outer diameter adjacent to the free end of the peripheral surface of the shaft portion can be pressed by the inner peripheral surface of the hole portion with the interference pressure during cooling for shrinkage fitting, which can strengthen the force for pulling the shaft portion into the hole portion.

When $\alpha 1$ is equal to $\alpha 2$, it is also possible to perform shrinkage fitting using the pulling force.

If the inclination angles $\alpha 1$ and $\alpha 2$ are equal to or less than 1/10000, sufficient pulling force is not caused by the interference pressure during shrinkage fitting. If they exceed 2°, thermal expansion is needed until the diameter of the opening of the hole portion exceeds the maximum diameter at the free end of the shaft portion, and this is inefficient.

In a further preferred embodiment of the present invention:

$$\beta 1 \leq \beta 2$$

where $\beta 1$ and $\beta 2$ are inclination angles of the shaft portion contact face and the hole portion contact face with respect to a radial line orthogonal to the center axis O of the cutting tool.

When the inclination angle $\beta 1$ of the shaft portion contact face is less than the inclination angle $\beta 2$ of the hole portion contact face, both the contact faces are in contact with each other at the outer peripheral edges, thereby preventing rattling.

The inclination angles $\beta 1$ and $\beta 2$ may have the following relationship:

$$0° \leq \beta 1 \text{ and } 0° < \beta 2$$

The inclination angle $\beta 1$ of the shaft portion contact face and the inclination angle $\beta 2$ of the hole portion contact face may be set at an arbitrary angle as long as both the contact faces can contact at the peripheral edges.

BRIEF DESCRIPTION OF THE DRAWINGS

FIG. 6 is a partly broken front view of a boring bar according to a second embodiment.

FIG. 7 is an enlarged view of a section D of the boring bar shown in FIG. 6.

DESCRIPTION OF THE PREFERRED EMBODIMENTS

Embodiments of the present invention will be described below with reference to the attached drawings. FIGS. 1 to 5 relate to a boring bar according to a first embodiment.

Figure 1:
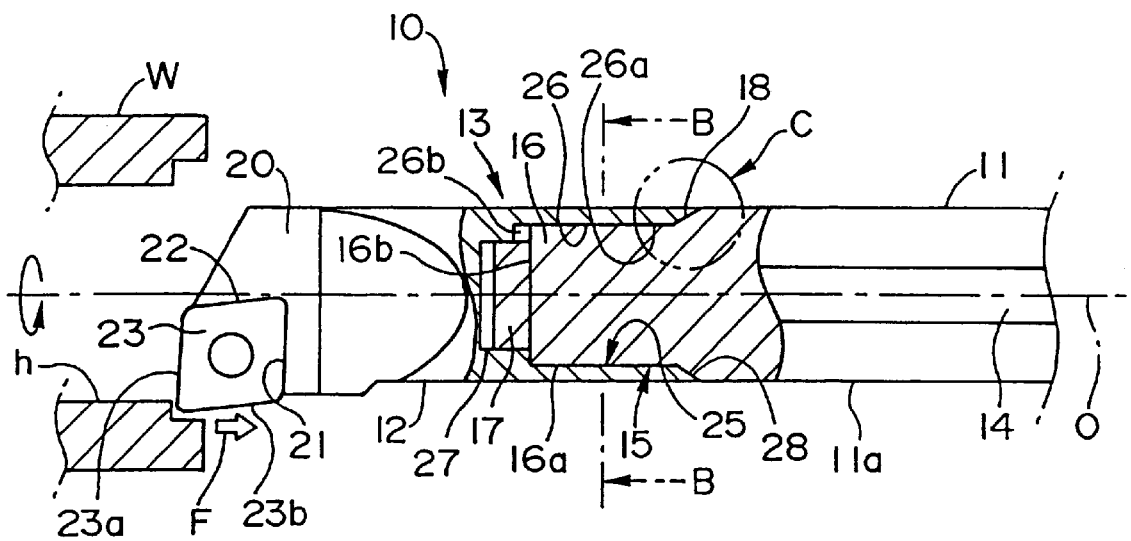
FIG. 1 is a sectional front view showing the principal part of a boring bar according to a first embodiment of the present invention.
Figure 2:
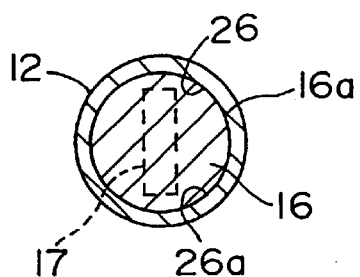
FIG. 2 is a cross-sectional view of the boring bar shown in FIG. 1, taken along line B—B.
Figure 3:
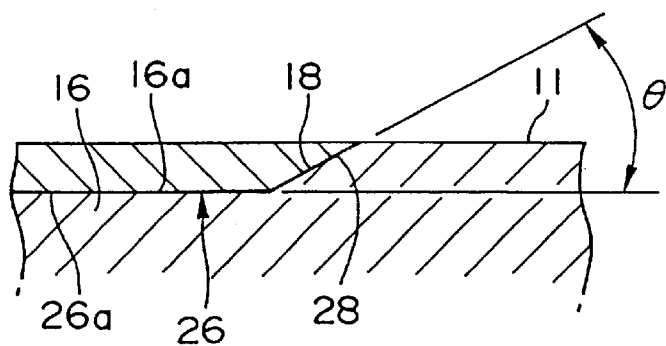
FIG. 3 is an enlarged view of a section C of the boring bar shown in FIG. 1.
Figures 4A, 4B:
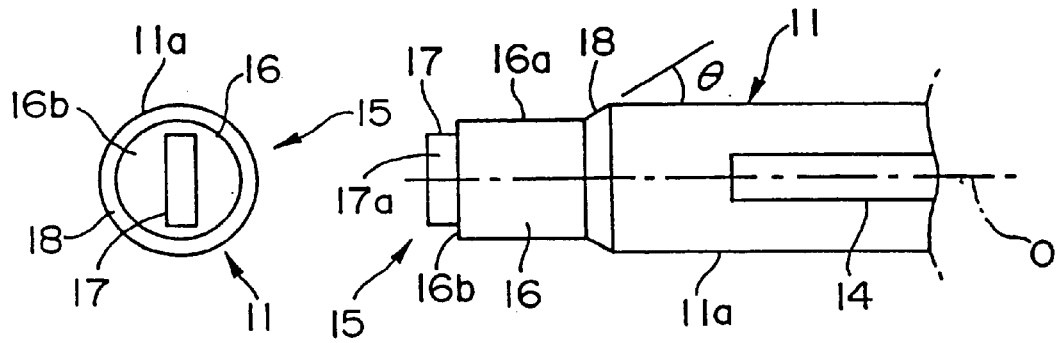
FIGS. 4(a) and 4(b) are side and bottom views, respectively, of a shank section of the boring bar according to the first embodiment.

A boring bar 10 shown in FIGS. 1 to 3 is formed of a combination of a shank section 11 and a head section 12 that are shrinkage-fitted in a fitting section 13. The shank section 11 is configured to be attached to a machine at one end of the shank section 11. The shank section 11, particularly as shown in FIG. 4, is made of, for example, cemented carbide, and has a substantially cylindrical shape. On the outer peripheral surface 11a thereof, flat holding portions 14 are formed in the longitudinal direction so as to be held at a predetermined position by a machine tool such as a machining center (not shown).

In a leading end portion 15 of the shank section 11 (on the side of the head section 12) forming one side of the fitting section 13, a nearly cylindrical shaft portion 16 is concentrically formed so as to have a smaller diameter than that of the outer peripheral surface 11. The shaft portion 16 includes a cylindrical peripheral surface 16a, and a circular leading end face 16b. The leading end face 16b is provided with a projecting key 17 that is substantially plate-shaped. Longitudinal side faces 17a of the key 17 are formed at positions nearly parallel to the holding portions 14 so as to be used to position a cutting edge of the head section 12.

Between the shaft portion 16 and the outer peripheral surface 11a, a first tapered portion 18 is formed in the shape of a ring. The inclination angle θ of the first tapered portion 18 is set to an appropriate acute angle with respect to the center axis O of the shank section 11 and is preferably close to 90° (see FIGS. 3 and 4).

Figures 5A, 5B:
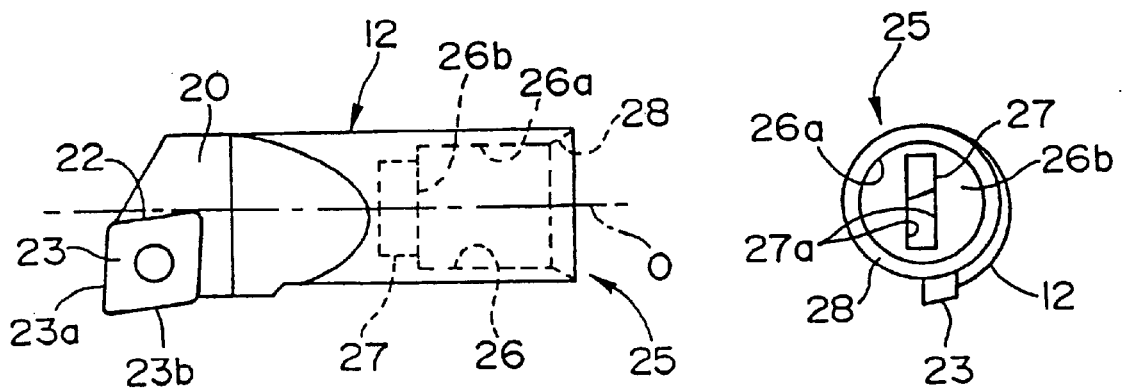
FIGS. 5(a) and 5(b) are side and bottom views, respectively, of a head section of the boring bar.

The head section 12, particularly as shown in FIG. 5, is made of, for example, steel, and has a substantially cylindrical shape. The head section 12 is provided with a concave portion 20 cut out at the leading end thereof. A concave chip mounting seat 21 is formed at the leading corner, and a throwaway tip 22 is fixed thereto by a screw or the like. Leading ridges of an upper surface 23 of the throwaway tip 22 serve as an end cutting edge 23a and a side cutting edge 23b.

A base end portion 25 of the head section 12 forms the other side of the fitting section 13. The base end portion 25 is concentrically provided with a substantially cylindrical hole portion 26 in which the shaft portion 16 of the shank section 11 is shrinkage-fitted. The hole portion 26 is generally formed of a cylindrical portion that forms the outer peripheral surface of the head section 12, and includes an inner peripheral surface 26a and a bottom face 26b. The bottom face 26b is provided with a key groove 27 to be fitted on the key 17 of the shank section 11. At the free end of the hole portion 26, which forms an opening, a ring-shaped second tapered portion 28 is formed to be tapered in cross section.

The second tapered portion 28 is shrinkage-fitted on the first tapered portion 18 of the shank section 11, as shown in FIG. 3. The inclination angle of the second tapered portion 28 with respect to the center axis O is set at almost the same angle θ as that of the first tapered portion 18.

In order for the inner peripheral surface 26a of the hole portion 26 to be shrinkage-fitted on the outer peripheral surface 16a of the shaft portion 16, the inner diameter thereof is set to be smaller than the outer diameter of the shaft portion 16 by the interference (e.g., 30 μm) for shrinkage fitting at ordinary temperature. The inner diameter of the second tapered portion 28 of the hole portion 26 is similarly set to be smaller than the corresponding outer diameter of the first tapered portion 18 of the shaft portion 16 by the interference (e.g., 30 μm) for shrinkage fitting.

Conversely, the outer diameters of the outer peripheral surface 16a of the shaft portion 16 and the first tapered portion 18 may be larger than the corresponding inner diameters of the inner peripheral surface 26a of the hole portion 26 and the second tapered portion 28 by the interference, or both may be provided with interferences.

The key groove 27 of the head section 12 is substantially of a platelike shape. Longitudinal side faces 27a of the key groove 27 are oriented in the direction orthogonal to the principal force of cutting resistance received by the end cutting edge 23a and the side cutting edge 23b of the throwaway tip 22 when a rotating work material W is subjected to boring by the boring bar 10. In other words, the principal force is produced in the tangential direction of a bored hole h of the work material W at the point of cutting by the end cutting edge 23a and the side cutting edge 23b, as shown in FIG. 1, and the side faces 27a of the key groove 27 are oriented in the direction orthogonal to the principal force.

The side faces 27a of the key groove 27 and the end cutting edge 23a are placed nearly parallel to each other, whereby the cutting edges 23a and 23b are positioned with respect to the shank section 11.

Thereby, the principal force of cutting resistance can be received by the side faces 17a and 27a of the key 17 and the key groove 27, which are substantially platelike and are fitted to each other, in a state in which the leading end portion 15 of the shank section 11 and the base end portion 25 of the head section 12 are shrinkage-fitted.

The boring bar 10 of this embodiment has the above-described configuration. Next, a manufacturing method therefor will be described.

In a state in which the head section 12 and the shank section 11 are separate from each other, as shown in FIGS. 4 and 5, the head section 12 is heated above ordinary temperature, and the shank section 11 is cooled. In this state, the base end portion 25 of the head section 12 and the leading end portion 15 of the shank section 11 are shrinkage-fitted with the side faces 17a and 27a of the key 17 and the key groove 27 aligned. In this case, when the key 17 is fitted in the key groove 27, the cutting edges 23a and 23b of the head section 12 are positioned in the circumferential direction with respect to the holding portions 14 of the shank section 11.

When the shaft portion 16 of the shank section 11 is fitted into the hole portion 26 of the head section 12, the head section 12 and the shank section 11 gradually return to ordinary temperature, the hole portion 26 shrinks and decreases its diameter, and the shaft portion 16 increases its diameter. Therefore, the shaft portion 16 is firmly shrinkage-fitted in the hole portion 26 by the pressure of the interference formed on the inner peripheral surface 26a of the hole portion 26.

Simultaneously, while the hole portion 26 of the head section 12 is contracting, the second tapered portion 28 of the hole portion 26 is pressed against the first tapered portion 18, and is shrinkage-fitted by the interference pressure.

In this case, even if the contact surfaces of the second tapered portion 28 and the first tapered portion 18 are slightly offset from the designed position due to dimensional errors caused by shrinkage of the head section 12 and expansion of the shank section 11 when returning to ordinary temperature, as long as the offset is within the interference, the tapered surfaces are in surface contact at the offset position and are surface-restrained by interference pressure. Although the interference pressure in this case is lower than designed corresponding to the offset, two-surface restraint, including the surface restraint between the shaft portion 16 and the hole portion 26, is established, which can increase stiffness of the overall boring bar 10.

In this way, the boring bar 10 shown in FIGS. 1 to 3 is manufactured.

Instead of the above-described manufacturing method, the head section 12 may be shrinkage-fitted on the shank section 11 before shrinkage thereof proceeds, and be then shrunk after fitting.

Next, the work material W is subjected to boring with the boring bar 10, as shown in FIG. 1.

A prepared hole h of the rotating work material W is bored by the end cutting edge 23a and the side cutting edge 23b. In this case, the principal force of cutting resistance acting on the cutting edges 23a and 23b is produced in the tangential direction at the cutting point (in the direction substantially orthogonal to the paper plane of FIG. 1 and from top to bottom thereof), e.g., in the direction substantially orthogonal to the cutting edges 23a and 23b.

For this reason, stress acts in a direction in which the head section 12 receiving the principal force twists with respect to the shank section 11. The principal force can be received by the contacting side faces 17a and 27a of the key 17 and the key groove 27 that are substantially orthogonal to the principal force in the fitting section 13. Simultaneously, this serves to prevent the head section 12 from being turned due to cutting resistance.

Moreover, stress for twisting the head 12 in the horizontal direction is caused to act by feed force F acting in the direction in which the work material W (or the boring bar 10 is fed. This stress can be received with the principal force by the restrained surfaces between the inner peripheral surface 26a of the hole portion 26 and the outer peripheral surface 16a of the shaft portion 16 and the restrained surfaces between the second tapered portion 28 and the first tapered portion 18, which also increases dynamic stiffness of the boring bar 10.

As described above, according to the present invention, since the head section 12 and the shank section 11 are shrinkage-fitted at the inner peripheral surface 26a of the hole portion 26 and the outer peripheral surface 16a of the shaft portion 16 and at the second tapered portion 28 and the first tapered portion 18, the head section 12 is detachable and replaceable, which can cope with the head section 12 having different types of cutting edges, and damage of the head section 12.

Moreover, shrinkage fitting allows two-surface restraint, and the principal force and the feed force of cutting resistance can be received, which can improve stiffness and dynamic stiffness of the boring bar 10. Furthermore, since the key and the key groove are also fitted in the fitting section 13, it is possible to ensure positioning accuracy of the cutting edges 23a and 23b with respect to the flat holding portions 14 in the shank section 11, to enhance the functions of receiving the principal force of the cutting resistance and of preventing turning, and to further improve dynamic stiffness.

Since one of the two surfaces restrained by shrinkage fitting is restrained between the second tapered portion 28 and the first tapered portion 18, even if the contact position therebetween is offset due to errors in shrinkage or expansion of the head section 12 and the shank section 11, the second tapered portion 28 and the first tapered portion 18 can be connected by shrinkage fitting by the interference pressure, which can reliably improve tool stiffness.

Next, a second embodiment of the present invention will be described with reference to FIGS. 6 to 9, in which the same components as those in the above-described first embodiment are denoted by the same numerals.

Figures 8A, 8B:
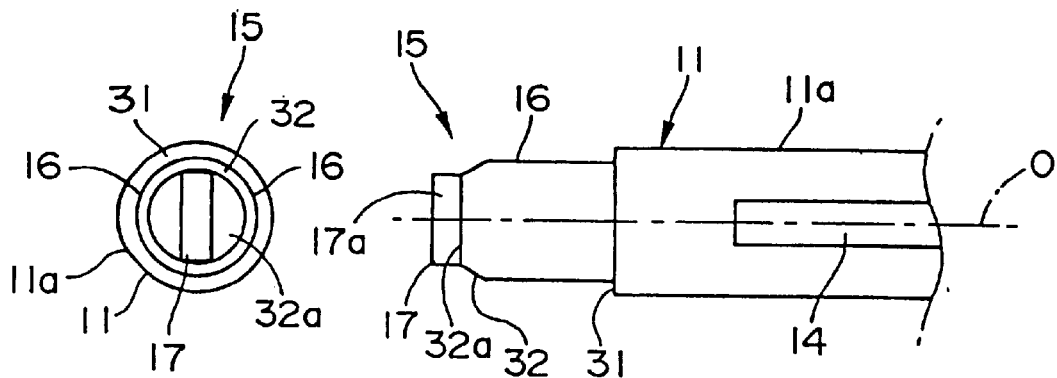
FIGS. 8(a) and 8(b) are front and leading end face views, respectively, of a shank section of the boring bar according to the second embodiment.

In a boring bar 30 of this embodiment, a connecting surface 31 between an outer peripheral surface 11a and a shaft portion 16 in a leading end portion 15 of a shank section 11 shown in FIGS. 6 and 8 is a ring-shaped flat surface nearly orthogonal to the center axis O. On the other hand, a taper portion 32 is formed between the shaft portion 16 and a key 17 over the entire periphery, and the key 17 having a substantially platelike shape is formed on a small-diameter leading end face 32a connected to the taper portion 32.

Figures 9A, 9B:
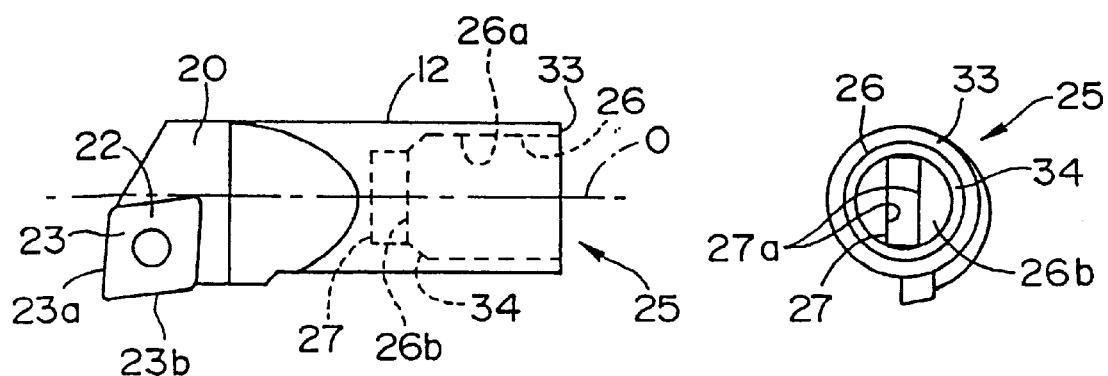
FIGS. 9(a) and 9(b) are front and bottom views, respectively, of a head section of the boring bar.

A hole portion 26 is formed in a base end portion 25 of a head section 12 shown in FIGS. 6 and 9, and a free end portion 33 thereof is a ring-shaped flat surface nearly orthogonal to the center axis O. Furthermore, a ring-shaped tapered portion 34 is formed between an inner peripheral surface 26a and a bottom face 26b of the hole portion 26 so as to be shrinkage-fitted on the taper portion 32. In this case, an interference is formed in the tapered portion 34 (or the taper portion 32, or both), and the corresponding inner diameter is set to be smaller than the outer diameter of the taper portion 32 by the interference.

The inclination angle θ of the tapered portion 34 of the hole portion 26 and the taper portion 32 of the shaft portion 16 with respect to the center axis O is set as shown in FIG. 7.

A substantially platelike key groove 27 is formed on the bottom face 26b.

In this embodiment, two-surface restraint can also be established by shrinkage fitting between the inner peripheral surface 26a of the hole portion 26 and the outer peripheral surface 16a of the shaft portion 16, and between the tapered portion 34 and the taper portion 32. In this case, when the head section 12 and the shank section 11 are subjected to shrinkage fitting, even if a gap is formed between the free end portion 33 of the hole portion 26 in the head section 12 and the connecting surface 32 of the shank section 11 due to errors in shrinkage or expansion, two-surface restraint can be established, as described above, which can reliably improve tool stiffness.

While the head section 12 is made of steel and the shank section 11 is made of cemented carbide in the above embodiment, the materials of the members are not limited to these materials, and various kinds of materials may be adopted. The members need not always be made of different materials, but may also be made of the same material.

While the shank section 11 includes the shaft portion 16 and the first tapered portion 18 or 32, and the head section 12 includes the hole portion 26 and the second tapered portion 28 or 34 in the above description, conversely, the shank section 11 including the hole portion 26 and the second tapered portion 28 or 34 and the head section 12 including the shaft portion 16 and the first tapered portion 18 or 32 may be shrinkage-fitted.

While the boring bar 10 is described in the above embodiment, the present invention is also applicable to various types of cutting tools, for example, other turning tools such as a single-point tool, and various milling tools such as an endmill and a drill.

Next, a third embodiment of the present invention will be described with reference to FIGS. 10 to 13.

Figure 10:
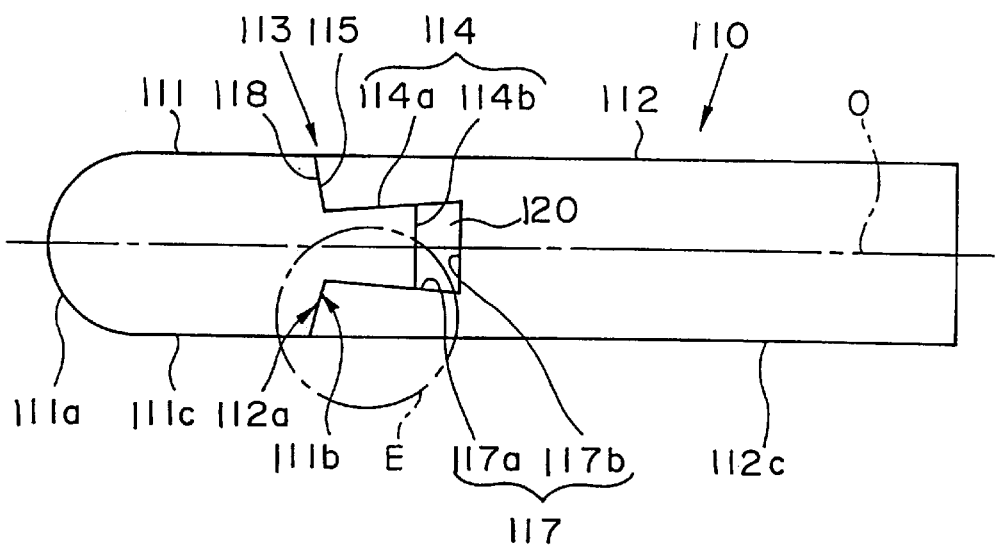
FIG. 10 is a longitudinal sectional view of a ball endmill according to a third embodiment of the present invention.
Figure 11:
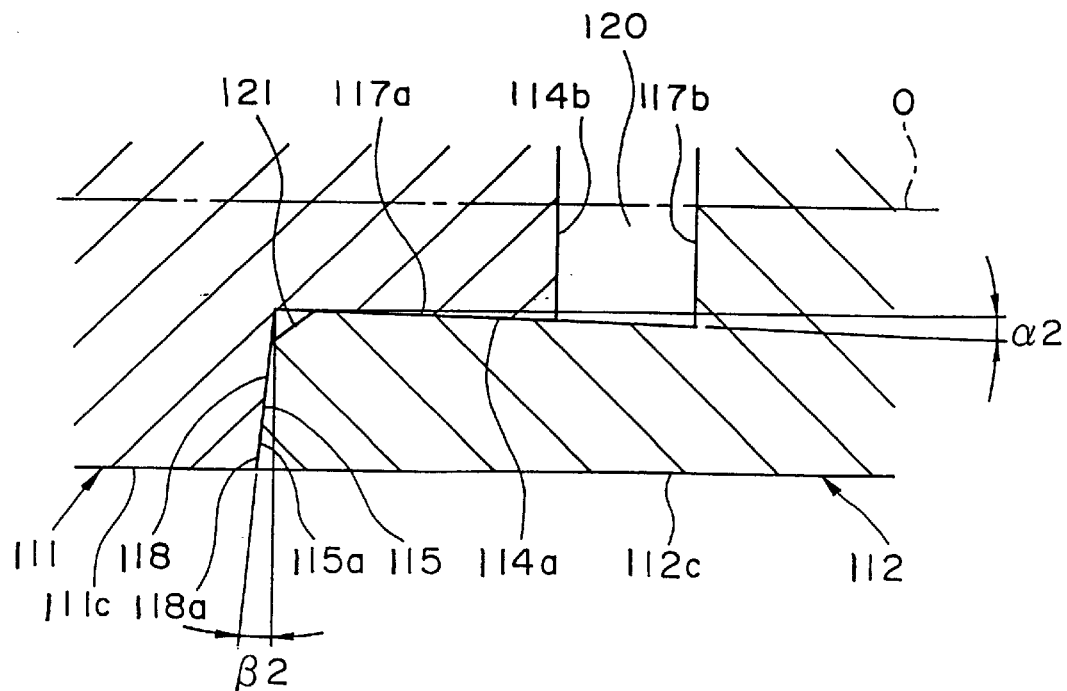
FIG. 11 is an enlarged view of a section E of the ball endmill shown in FIG. 10.

A ball endmill 110 shown in FIGS. 10 and 11 is formed by combining a head section 111 and a shank section 112 into one by shrinkage fitting at a fitting section 113.

The head section 111 is made of, for example, cemented carbide, cermet, or ceramic. An outer peripheral surface 111c thereof is substantially cylindrical, and a leading end portion 111a is formed in a substantially hemispherical shape. Mounted in the leading end portion 111a is a throwaway tip or a cutting edge (not shown). In a base end portion 111b of the head section 111, a shaft portion 114 in the shape of, for example, a substantially truncated cone having a smaller diameter than that of the outer peripheral surface 111c is formed, and the outer periphery thereof serves as a ring-shaped contact face 115 (shaft portion contact face).

The shaft portion 114 includes a peripheral surface 114a in the shape of a peripheral surface of a truncated cone, and a circular end face 114b that has the maximum outer diameter at the leading end, that is, the free end of the shaft portion 114. The outer shape of the shaft portion 114 is tapered so that the outer diameter gradually increases from a portion connected to the contact face 115 toward the end face 114b. The shaft portion 114 is formed coaxially with the center axis O1 of the head section 111.

The shank section 112 is made of a material having a higher coefficient of thermal expansion (coefficient of linear expansion) than that of the head section 111, for example, steel, and is substantially cylindrical. The outer diameter of an outer peripheral surface 112c is set to be almost the same as the outer diameter of the outer peripheral surface 111c of the head section 111. A leading end portion 112a is provided with a hole portion 117 in the shape of, for example, a substantially truncated cone having a smaller diameter than that of the outer peripheral surface 112c. A ring-shaped contact face 118 (hole portion contact face) is formed on the outer peripheral side thereof. The hole portion 117 includes an inner peripheral surface 117a in the shape of a peripheral surface of a truncated cone, and a circular bottom face 117b. The inner peripheral surface 117a is formed so that the inner diameter gradually increases from an opening portion connected to the contact face 118 toward the bottom face 117b. The hole portion 117 is formed coaxially with the center axis O2 of the shank section 112.

The shaft portion 114 of the head section 111 and the hole portion 117 of the shank section 112 are fitted together by shrinkage fitting, thereby constituting the fitting section 113. The center axis O of the ball endmill 110 coincides with the center axis O1 of the head section 111 and the center axis O2 of the shank section 112.

An outer diameter d1 of the peripheral surface 114a of the shaft portion 114 gradually increases from the portion connected to the contact face 115 toward the end face 114b, and an inner diameter d2 of the inner peripheral surface 117a of the hole portion 117 gradually increases from the portion connected to the contact face 118 toward the bottom face 117b. The depth of the hole portion 117 of the shank section 112 in the direction of the center axis O2 is set to be slightly larger than the length of the shaft portion 114 of the head section 111 in the direction of the center axis O1, and a small space 120 is formed between the end face 114b of the shaft portion 114 and the bottom face 117b of the hole portion 117 in a fitted state shown in FIGS. 10 and 11 in which the contact faces 115 and 118 of the head section 111 and the shank section 112 are in contact with each other.

In the fitted state, the outer diameter d1 of the shaft portion 114 in a cross section at an arbitrary position intersecting the center axis O (hereinafter referred to as an "axis-intersecting cross section") is set to be slightly larger than the inner diameter d2 of the hole portion 117. The size difference (d1−d2) therebetween in an arbitrary axis-intersecting cross section serves as an interference in shrinkage-fitting the shaft portion 114 in the hole portion 117.

Figure 12:
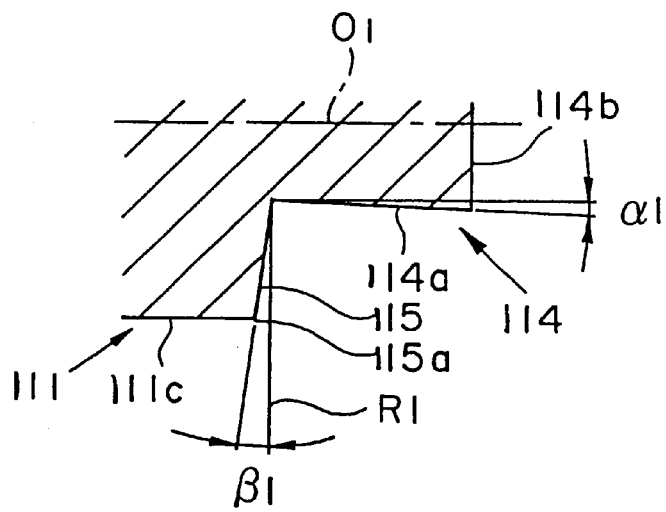
FIG. 12 is an enlarged view of a head section of the ball endmill shown in FIG. 11.

In FIG. 12 as a longitudinal sectional view, the tapered peripheral surface 114a of the shaft portion 114 is inclined from the portion connected to the contact face 115 toward the end face 114b at a small angle α1 with respect to the center axis O1. Furthermore, the contact face 115 is inclined at a small angle β1 with respect to a radial line R1 orthogonal to the center axis O1. For this reason, the crossing angle formed between the contact face 115 and the outer peripheral surface 111c is obtuse.

Figure 13:
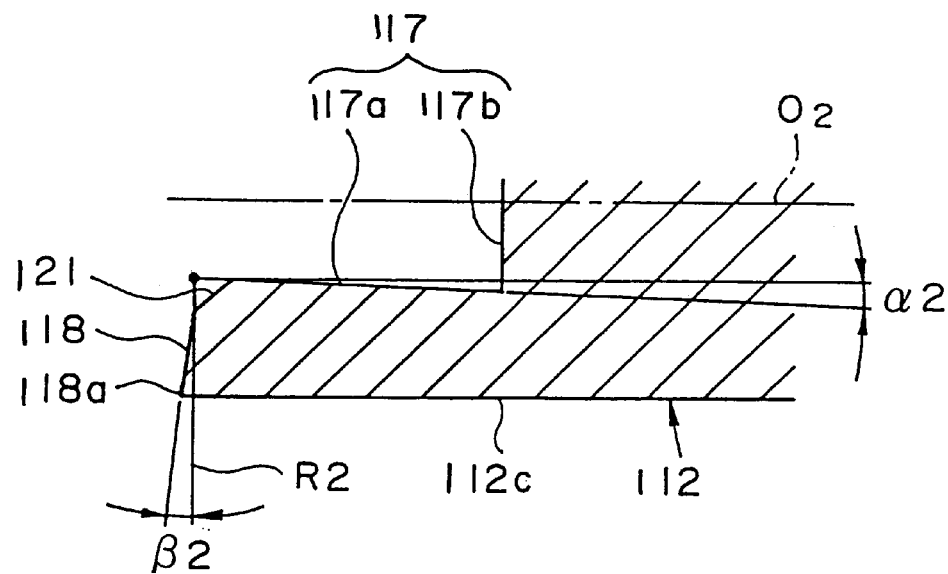
FIG. 13 is an enlarged view of a shank section of the ball endmill shown in FIG. 11.

In FIG. 13 as a longitudinal sectional view, the tapered inner peripheral surface 117a of the hole portion 117 is inclined from the portion connected to the contact face 118 toward the bottom face 117b at a small angle α2 with respect to the center axis O2. Furthermore, the contact face 118 is inclined at a small angle β2 with respect to a radial line R2 orthogonal to the center axis O2. For this reason, the crossing angle formed between the contact face 118 and the outer peripheral surface 112c is acute.

β2 may be set so that the crossing angle is obtuse. In this case, β1 is also set so that the crossing angle between the contact face 115 and the outer peripheral surface 111c is acute.

In the crossing section of the inner peripheral surface 117a of the hole portion 117 and the contact face 118, a chamfered portion 121 is formed over the entire periphery in connection with the shaft portion 114.

The angles α1 and α2 have the following relations:

$$(1/10000)° < α1 < 2° \text{ and } (1/10000)° < α2 < 2° \tag{1}$$

and $$\alpha 1 \geq \alpha 2 \quad (2)$$

Furthermore, the angles β1 and β2 have the following relations:

$$0° \leq \beta 1 \text{ and } 0° < \beta 2 \quad (3)$$

and $$\beta 1 \leq \beta 2 \quad (4)$$

Regarding the above expression (1), if the inclination angles α1 and α2 of the shaft portion 114 and the hole portion 117 are greater than 1°, the largest outer diameter d1 at the insertion end (free end) of the shaft portion 114 excessively differs from the smallest inner diameter d2 at the opening of the hole portion 117 during heating for shrinkage fitting. Therefore, the hole portion 117 must be thermally expanded by further raising the heating temperature, and this decreases the shrinkage fitting efficiency. With respect to the relationship given by the expression (2), it is extremely difficult to perform working so that the inclination angle α1 of the shaft portion 114 and the inclination angle α2 of the hole portion 117 are equal to each other. By performing working so as to satisfy at least the expression (2), the free end of the shaft portion 114 (the adjacency of the end face 114b) can be pressed and pulled in by the inner peripheral surface 117a of the hole portion 117 during cooling, thereby further increasing the pull-in fitting strength.

Next, regarding the relations given by the expressions (3) and (4), even when the inclination angle β1 of the contact face 115 of the shaft portion 114 is 0°, as long as the inclination angle β2 of the contact face 118 of the hole portion 117 is greater than 0°, an outer peripheral edge 118a of the contact face 118 of the hole portion 117 can contact with an outer peripheral edge 115a of the contact face 115 of the shaft portion 114. Accordingly, even if the contact faces 115 and 118 are uneven, it is possible to prevent rattling, and to firmly fix the head section 111 and the shank section 112 by high-precision stable restraint.

The ball endmill 110 of this embodiment has the above-described configuration. Next, a fitting method therefor will be described.

In a state in which the head section 111 and the shank section 112 are separate, the shank section 112 is heated to a temperature higher than ordinary temperature. While the inner diameter d2 of the chamfered portion 121 serving as the opening of the hole portion 117 in the shank section 112 is made greater than the outer diameter d1 of the end face 114b serving as the largest outer diameter of the shaft portion 114, the shaft portion 114 and the hole portion 117 are fitted to a position where the contact faces 115 and 118 contact with each other, thereby establishing shrinkage fitting.

Then, when the head section 111 and the shank section 112 are returned to ordinary temperature, the hole portion 117 contracts and decreases its diameter. Therefore, the shaft portion 114 is firmly shrinkage-fitted in the hole portion 117 by the pressure of interferences corresponding to differences (d1−d2) in diameter between the shaft portion 114 and the hole portion 117 in the axis-intersecting cross sections along the longitudinal direction of the center axis O.

When the shaft portion 114 and the hole portion 117 are subjected to shrinkage fitting, since the peripheral surface 114a of the shaft portion 114 and the inner peripheral surface 117a of the hole portion 117 have the inclination angles α1 and α2, the peripheral surface 114a adjacent to the end face 114b serving as the free end of the shaft portion 114 or the overall peripheral surface 114a is pressed by the inner peripheral surface 117a of the hole portion 117 that contracts with cooling according to the expression (2). Therefore, the shaft portion 114 is pulled into the hole portion 117 toward the bottom face 117b by the pressure of the interference corresponding to the size difference (d1−d2) in the axis-intersecting cross section, which establishes firmer fastening and fitting.

Simultaneously, since the contact faces 115 and 118 contact with each other at the outer peripheral edges 115a and 118a according to the expression (4), pressure fixing is stably and precisely performed, regardless of evenness of the contact faces 115 and 118.

In this way, the head section 111 and the shank section 112 are subjected to two-surface restraint by shrinkage fitting of the shaft portion 114 and the hole portion 117.

In the above expression (2), α1 may be less than α2. In this case, shrinkage fitting can be established by pressing the base portion of the shaft portion 114 connected to the contact face 115 by the hole portion 117, and precision is improved. Furthermore, α1 may be equal to α2. In this case, shrinkage fitting can be also performed by the pulling force.

As described above, according to this embodiment, firm pull-in fitting can be established by the peripheral surface 114a of the shaft portion 114 and the inner peripheral surface 117a of the hole portion 117. Since the contact faces 115 and 118 contact with each other at the outer peripheral edges 115a and 118a, it is possible to prevent rattling due to pressure contact, to perform precise and firm pressure contact, and to establish firm and precise shrinkage fitting using two-surface restraint.

Next, modifications of the above-described third embodiment will be described with reference to FIGS. 14 to 16. The same or similar components as or to those in the third embodiment are denoted by the same numerals.

Figure 14:
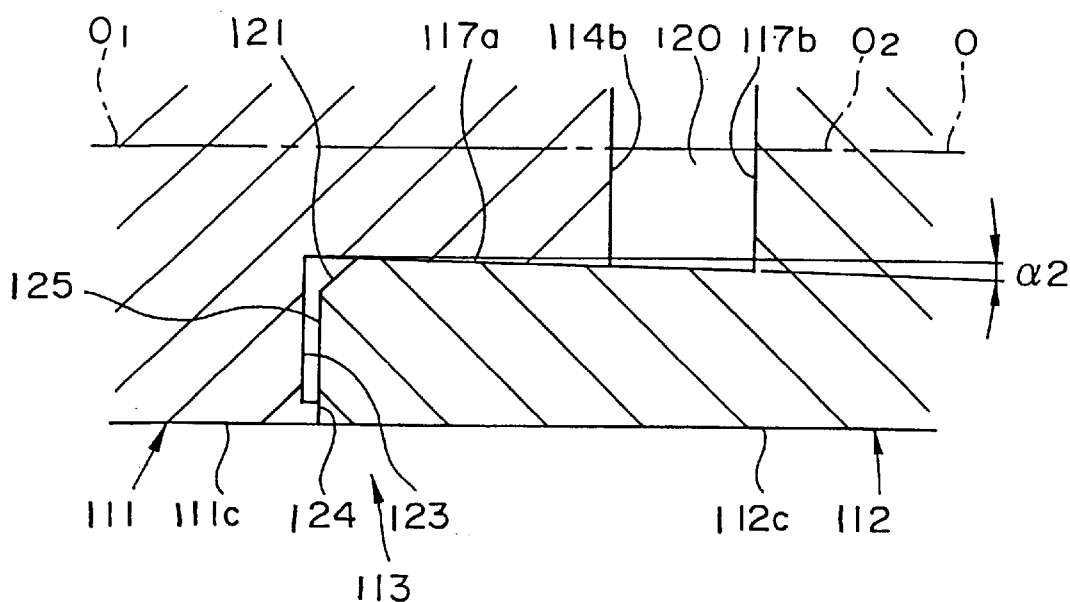
FIG. 14 is an enlarged sectional view of a fitting section in a first modification of the ball endmill of the third embodiment, similar to FIG. 1.

FIG. 14 is a cross-sectional view showing the principal part of a fitting section in a first modification, similar to FIG. 11.

In FIG. 14, regarding a shaft portion 114 of a head section 111 and a hole portion 117 of a shank section 114, in FIG. 14, a peripheral surface 114a of the shaft portion 114 and an inner peripheral surface 117a of the hole portion 117 have the same structures as those in the above-described third embodiment.

A contact face 123 (shaft portion contact face) of the shaft portion 114 is a flat face nearly orthogonal to the center axis O1, and a projection 124 of rectangular cross section is formed at the overall outer peripheral edge of the contact face 123 so as to project in a direction nearly parallel to the center axis O1. On the other hand, a contact face 125 (hole portion contact face) of the hole portion 117 facing the contact face 123 is a flat surface nearly orthogonal to the center axis O2 to the outer peripheral edge intersecting an outer peripheral surface 112c.

For this reason, during shrinkage fitting, the projection 124 of the contact face 123 of the shaft portion is fixed in pressure contact with the contact face 125 of the hole portion 117 at the outer peripheral edges.

Such a structure can also establish firm and precise fitting of the contact faces 123 and 125 without causing rattling.

Figure 15:
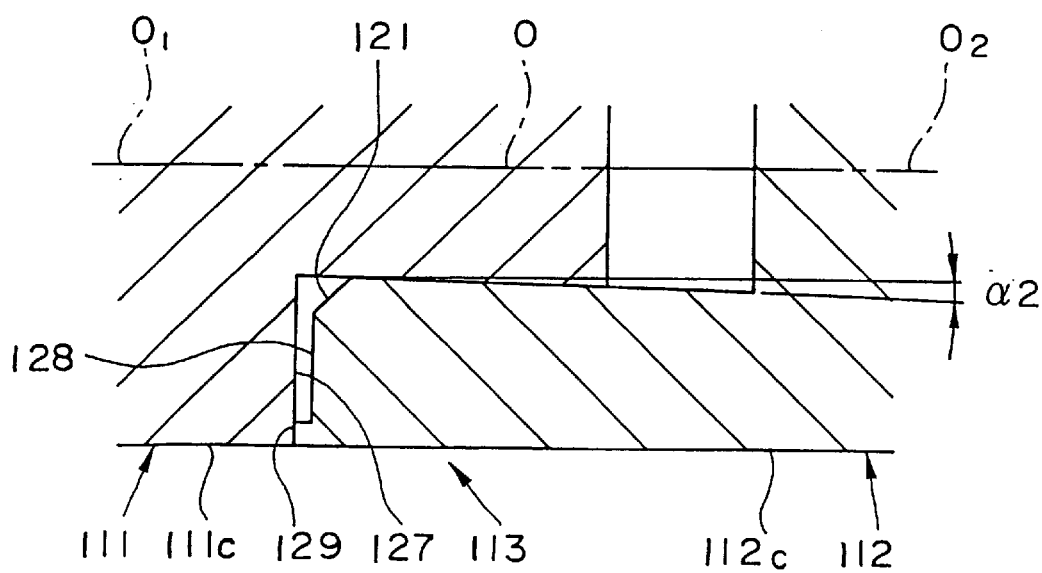
FIG. 15 is an enlarged sectional view of a fitting section in a second modification of the ball endmill of the third embodiment, similar to FIG. 1.

FIG. 15 is a cross-sectional view showing the principal part of a fitting section in a second modification, similar to FIG. 11.

In FIG. 15, regarding a shaft portion 114 of a head section 111 and a hole portion 117 of a shank section 112, an outer peripheral surface 114a of the shaft portion 114 and an inner peripheral surface 117a of the hole portion 117 also have the same structures as those in the above-described first embodiment.

A contact face 127 (shaft portion contact face) of the shaft portion 114 is a flat surface nearly orthogonal to the center axis O1. On the other hand, a contact face 128 (hole portion contact face) of the hole portion 117 facing the contact face 127 is a flat surface nearly orthogonal to the center axis O2. A projection 129 of rectangular cross section is formed at the overall outer peripheral edge thereof intersecting an outer peripheral surface 112c so as to project in a direction nearly parallel to the center axis O2.

According to such a structure, the contact faces 127 and 128 are pressed by the projection 129 at the outer peripheral edge in a manner similar to the first modification, and firm and precise fitting can be established without causing rattling.

The above-described projection 124 or 129 is not limited to the above modifications, and may be formed on the contact faces 115 and 118 with the inclination angles β1 and β2 which have been described in the first embodiment.

While the head section 111 is made of cemented carbide or the like and is provided with the shaft portion 114 and the shank section 112 is made of a material having a higher coefficient of thermal expansion than that of the head section 111, for example, steel, and is provided with the hole portion 117 in the above embodiments, they may have reverse structures.

Figure 16:
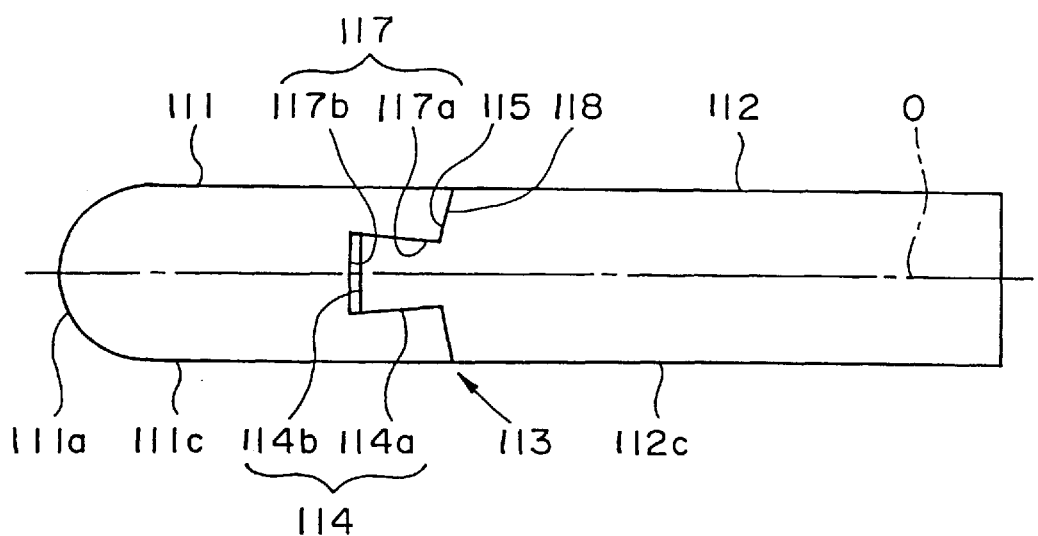
FIG. 16 is a longitudinal sectional view showing a third modification of the ball endmill of the third embodiment.

That is, in a third modification shown in FIG. 16, a head section 111 is made of a material having a higher coefficient of thermal expansion than that of a shank section 112, for example, steel, and is provided with a hole portion 117. In contrast, the shank section 112 is made of a material having a lower coefficient of thermal expansion than that of the head section 111, such as cemented carbide, cermet, or ceramic, and is provided with a shaft portion 114. A contact face 118 is formed on the outer peripheral side of the hole portion 117 in the head section 111, and a contact face 115 is formed on the outer peripheral side of the shaft portion 114 in the shank section 112.

This case can also provide the same operations and advantages as those in the above description.

Next, a fourth embodiment of the present invention will be described with reference to FIG. 17 as a longitudinal sectional view of a ball endmill. The same or similar members as or to those in the above embodiments are denoted by the same numerals, and description thereof is omitted.

Figure 17:
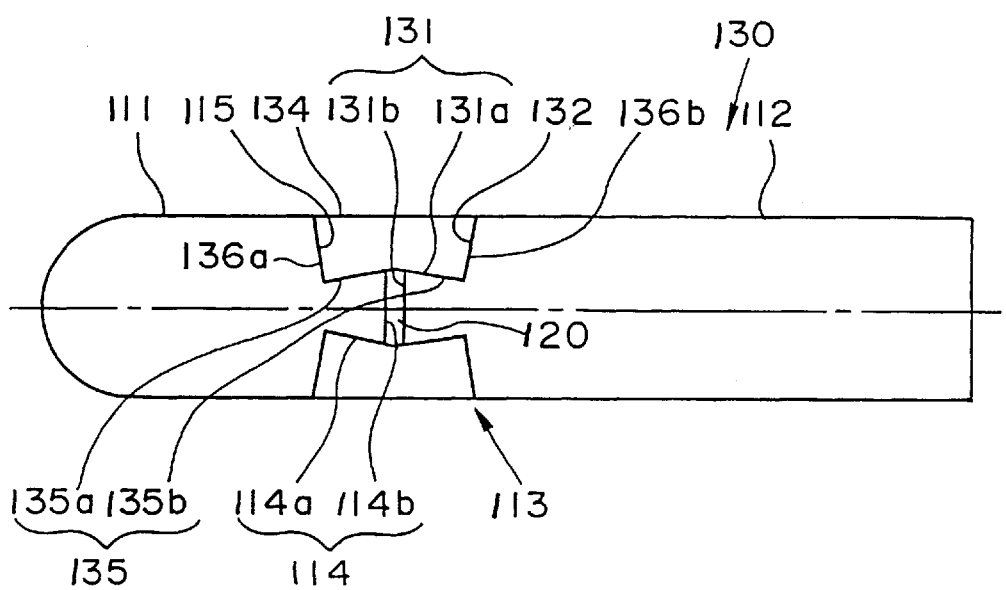
FIG. 17 is a longitudinal sectional view of a ball endmill according to a fourth embodiment of the present invention.
Figure 18:
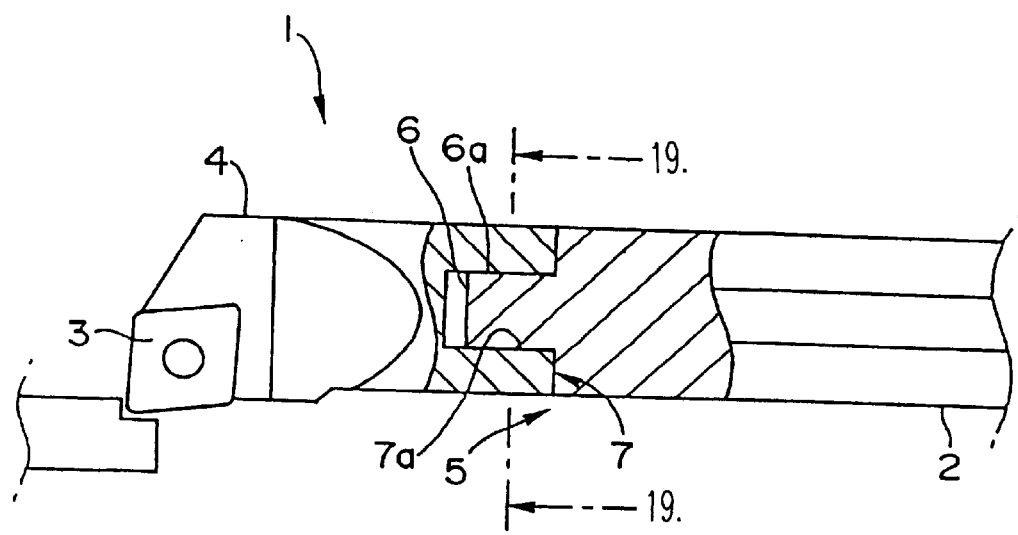
FIG. 18 is a partly broken front view of a conventional boring bar.
Figure 19:
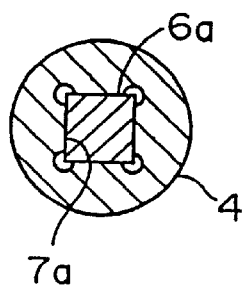
FIG. 19 is a cross-sectional view, taken along line A—A of FIG. 18.

In a ball endmill 130 shown in FIG. 17, both a head section 111 and a shank section 112 are made of a material having a low coefficient of thermal expansion, such as cemented carbide, cermet, or ceramic. By making the shank section 112 of the material having high hardness and high rigidity, such as cemented carbide, the vibration-isolating effect is improved during cutting or the like. The head section 111 has the same structure as that in the above-described third embodiment, and is provided with a tapered shaft portion 114 in a base end portion 111b.

In a leading end portion 112a of the shank section 112, instead of the hole portion 117, a second shaft portion 131 projects coaxially with the center axis O2, and a ring-shaped second contact face 132 (shaft portion contact face) is formed in the radial direction on the outer periphery thereof. The second shaft portion 131 is shaped nearly like a truncated cone having an outer diameter d1 that is almost the same as that of the shaft portion 114 in the head section 111. The second shaft portion 131 includes a tapered peripheral surface 131a and an end face 131b. The outer diameter d1 of the second shaft portion 131 gradually increases from the portion connected to the second contact face 132 toward the end face 131b, and the inclination angle α1 is the same as that of the shaft portion 114.

Moreover, the second contact face 132 is placed at an angle β with respect to the radial line direction orthogonal to the center axis O2, in a manner similar to the contact face 115 of the head section 111, and is inclined toward the opposite side so as to face the contact face 115.

In a fitting section 113, a substantially cylindrical connecting member 134 is provided to shrinkage-fit the shaft portion 114 of the head section 111 and the second shaft portion 131 of the shank section 112 that face each other. The connecting member 134 is made of a material having a higher coefficient of thermal expansion than those of the head section 111 and the shank section 112, for example, steel, and an inner peripheral surface 135 thereof is composed of a first inclined portion 135a and a second inclined portion 135b, as viewed in the direction of the center axis O3. The first inclined portion 135a and the second inclined portion 135b are tapered so that the inner diameter gradually decreases from the center intersection toward both ends.

In addition, the first and second inclined portions 135a and 135b have the gradually varying inner diameter d2 that is the same as that of the hole portion 117 in the above-described third embodiment. In an arbitrary axis-intersecting cross section in the fitted state, the differences (d1−d2) between the outer diameters d1 and d1 of the shaft portion 114 and the second shaft portion 131 and the inner diameters d2 and d2 of the first and second inclined portions 135a and 135b serve as interferences.

For this reason, the first and second inclined portions 135a and 135b are formed to be inclined at angles α2 and α2 with respect to the center axis O3. The relationship between the inclination angles α1 and α1 of the shaft portion 114 of the head section 111 and the second shaft portion 131 of the shank section 112 with respect to the center axes O1 and O2 satisfies the above-described expressions (1) and (2).

The length L of the first inclined portion 135a and the second inclined portion 135b of the connecting member 134 along the center axis O3 are set to be larger than the length L1 of the shaft portion 114 and the length L2 of the second shaft portion 131 in the same direction. Referring to FIG. 17, 2L is set to be longer than the sum of L1 and L2. In a shrinkage-fitted state, a space 120 is formed between the inner peripheral surface 135 of the connecting member 134 and the shaft portions 114 and 131, and the length thereof in the direction of the center axis O3 is equal to 2L−(L1+L2).

The center axes O1, O2, and O3 are coaxial, and coincide with the center axis O of the ball endmill 130.

Both end faces 136a and 136b of the connecting member 134 form inclined surfaces so that the length therebetween gradually decreases from the outer peripheral side toward the inner peripheral surface 135. The end faces 136a and 136b are inclined at the inclination angles β2 and β2 with respect to the radial line direction orthogonal to the center axis O3. For this reason, the inclination angles β2 and β2 satisfy the relationships, which are given by the above expressions (3) and (4), with the inclination angles β1 and β1 of the contact face 115 of the head section 111 and the second contact face 132 of the shank section 112.

Since this embodiment has the above-described configuration, while the connecting member 134 is heated to increase its diameter, the shaft portion 114 of the head section 111 and the second shaft portion 131 of the shank section 112 are inserted into the connecting member 134 from both ends, and are shrinkage-fitted together. In this case, the shaft portion 114 is pulled in by the first inclined portion 135a of the connecting member 134, the second shaft portion 131 is pulled in by the second inclined portion 135b, and the shaft portions are fixed by the interference (d1−d2) in an arbitrary axis-intersecting cross section. In this case, the contact faces 115 and 132 of the head section 111 and the shank section 112 are in contact with the both end faces 136a and 136b of the connecting member 134, and reliably contact at the outer peripheral edges.

Accordingly, this embodiment can also achieve the same operations and advantages as those in the above-described third embodiment. Moreover, both the head section 111 and the shank section 112 have high stiffness and provide a high degree of effectiveness of vibration isolation.

In this embodiment, two-surface restraint can also be established by shrinkage fitting of the shaft portion 114, the second shaft portion 131, and the connecting member 134, thereby reliably improving tool stiffness.

While the head section 111, the shank section 112, and the connecting member 134 are made of steel, cemented carbide, or the like in the above embodiment, the materials of the members are not limited to these materials, and other various kinds of materials may be adopted. The members need not always be made of different materials, and may be made of the same material.

While the ball endmills 110 and 130 have been described in the above embodiments, the present invention is also applicable to various types of cutting tools, for example, other turning tools such as a single-point tool, and various milling tools such as an endmill and a drill. In the present invention, the tool and the tool holding portion may be fitted not only by shrinkage fitting, but also by expansion fitting.

What is claimed is:

1. An interference fit cutting tool comprising:
    a shank section which has an end and another end and which is configured to be attached to a machine at the end of the shank section and which is provided at the another end of the shank section with a tapered hole portion, an inner peripheral surface of the tapered hole portion being inclined to decrease a diameter toward an opening of said tapered hole portion; and
    a head section which has an end and another end and which is configured to be provided with a cutting tip at the end of the head section and which is provided at the another end of the head section with a tapered shaft portion which is configured to correspond to the tapered hole portion, an outer peripheral surface of said tapered shaft portion being inclined to increase a diameter of the tapered shaft portion toward a free end of said tapered shaft portion, the shank section having a coefficient of thermal expansion higher than that of the head section such that the tapered shaft portion is interference shrink-fitted in the tapered hole portion.

2. An interference fit cutting tool according to claim 1, wherein a shaft portion contact face on an outer periphery of said tapered shaft portion and a hole portion contact face on an inner periphery of said hole portion contact.

3. An interference fit cutting tool according to claim 2, wherein:

$$\beta 1 \leq \beta 2$$

where $\beta 1$ and $\beta 2$ are inclination angles of said shaft portion contact face and said hole portion contact face respectively, with respect to a radial line orthogonal to a center axis O of the cutting tool.

4. An interference fit cutting tool according to claim 1, wherein:

$$(1/10000)° < \alpha 1 < 2° \text{ and } (1/10000)° < \alpha 2 < 2°$$

where $\alpha 1$ and $\alpha 2$ are acute inclination angles of the outer peripheral surface of said shaft portion and the inner peripheral surface of said hole portion respectively, with respect to a center axis O of the cutting tool.

5. An interference fit cutting tool comprising:
    a shank section which has an end and another end and which is configured to be attached to a machine at the end of the shank section and which is provided at the another end of the shank section with a tapered shaft portion, an outer peripheral surface of said tapered shaft portion being inclined to increase a diameter of the tapered shaft portion toward a free end of said tapered shaft portion; and
    a head section which has an end and another end and which is configured to be provided with a cutting tip at the end of the head section and which is provided at the another end of the head section with a tapered hole portion which is configured to correspond to the tapered shaft portion, an inner peripheral surface of the tapered hole portion being inclined to decrease a diameter toward an opening of said tapered hole portion, the shank section having a coefficient of thermal expansion lower than that of the head section such that the tapered shaft portion is interference shrink-fitted in the tapered hole portion.

6. An interference fit cutting tool according to claim 5, wherein:

$$(1/10000)° < \alpha 1 < 2° \text{ and } (1/10000)° < \alpha 2 < 2°$$

where $\alpha 1$ and $\alpha 2$ are acute inclination angles of the outer peripheral surface of said shaft portion and the inner peripheral surface of said hole portion respectively, with respect to a center axis O of the cutting tool.

7. An interference fit cutting tool according to claim 5, wherein a shaft portion contact face on an outer periphery of said tapered shaft portion and a hole portion contact face on an inner periphery of said hole portion contact.

8. An interference fit cutting tool according to claim 7, wherein:

$$\beta 1 \leq \beta 2$$

where $\beta 1$ and $\beta 2$ are inclination angles of said shaft portion contact face and said hole portion contact face respectively, with respect to a radial line orthogonal to a center axis O of the cutting tool.

9. An interference fit cutting tool comprising:
    a shank section which has an end and another end and which is configured to be attached to a machine at the end of the shank section and which is provided at the another end of the shank section with a shank tapered shaft portion, an outer peripheral surface of said shank tapered shaft portion being inclined to increase a diameter of the shank tapered shaft portion toward a free end of said shank tapered shaft portion;
    a head section which has an end and another end and which is configured to be provided with a cutting tip at the end of the head section and which is provided at the another end of the head section with a head tapered shaft portion, an outer peripheral surface of said head tapered shaft portion being inclined to increase a diameter of the head tapered shaft portion toward a free end of said head tapered shaft portion; and a connecting member having a tapered hole with first and second tapered hole portions which is configured to correspond to the shank tapered shaft portion and the head tapered shaft portion, respectively, an inner peripheral surface of each of the first and second tapered hole portions being inclined to decrease a diameter toward an opening of each of said first and second tapered hole portions, the connecting member having a coefficient of thermal expansion higher than those of the shank section and the head section such that the shank and head tapered shaft portions are interference shrink-fitted in the first and second tapered hole portions, respectively.

10. An interference fit cutting tool according to claim 9, wherein:

$$(1/10000)° < \alpha_1 < 2° \text{ and } (1/10000)° < \alpha_2 < 2°$$

where $\alpha_1$ is an acute inclination angle of the outer peripheral surface of each of said shank and head tapered shaft portions with respect to a center axis O of the cutting tool, and $\alpha_2$ is an acute inclination angle of the inner peripheral surface of each of said first and second tapered hole portions with respect to the center axis O.

11. An interference fit cutting tool according to claim 9, wherein a shaft portion contact face on an outer periphery of each of said shank and head tapered shaft portions and a hole portion contact face on an inner periphery of each of said first and second tapered hole portions contact.

12. An interference fit cutting tool according to claim 11, wherein:

$$\beta_1 \leq \beta_2$$

where $\beta_1$ and $\beta_2$ are inclination angles of said shaft portion contact face and said hole portion contact face respectively, with respect to a radial line orthogonal to a center axis O of the cutting tool.

* * * * *